United States Patent [19]

Ayers

[11] 4,399,601

[45] Aug. 23, 1983

[54] METHOD OF PREPARING AND USING A PRESSURE ACTUATED RELEASE MECHANISM

[75] Inventor: Ray R. Ayers, Houston, Tex.

[73] Assignee: Shell Oil Company, Houston, Tex.

[21] Appl. No.: 402,172

[22] Filed: Jul. 26, 1982

Related U.S. Application Data

[63] Continuation of Ser. No. 135,835, Mar. 31, 1980, abandoned.

[51] Int. Cl.³ .......................... B23P 17/00; F16L 1/04
[52] U.S. Cl. .......................................... 29/407; 29/414; 29/415; 29/421 R; 405/154; 405/168; 405/171
[58] Field of Search ................. 29/407, 413, 414, 415, 29/416, 421 R, 422; 405/154, 162, 169, 168, 171

[56] References Cited

U.S. PATENT DOCUMENTS

| | | | |
|---|---|---|---|
| 2,430,995 | 11/1947 | Roos | 29/422 X |
| 2,469,975 | 5/1949 | McCloy | 29/422 X |
| 3,145,465 | 8/1964 | Coolidge et al. | 29/422 X |
| 3,192,621 | 7/1965 | Bauer et al. | 29/510 |
| 3,196,657 | 7/1965 | Fromson | 138/172 X |
| 3,262,275 | 7/1966 | Peret | 405/171 |
| 3,334,407 | 8/1967 | De Santis | 29/422 X |
| 3,425,115 | 2/1969 | Handwerk et al. | 29/421 R |
| 3,430,601 | 3/1969 | Thompson | 114/235 |
| 3,620,028 | 11/1971 | Wilde | 405/171 |
| 3,727,417 | 4/1973 | Shaw | 405/171 |
| 3,765,185 | 10/1973 | Peck et al. | 405/168 |
| 3,795,115 | 3/1974 | Berquist et al. | 405/170 |
| 3,835,655 | 9/1974 | Oliver | 405/170 |
| 3,909,774 | 9/1975 | Pavey | 114/245 |
| 3,921,562 | 11/1975 | Kelly | 114/245 |

FOREIGN PATENT DOCUMENTS 55-35205 3/1980 Japan .................................. 29/422

*Primary Examiner*—Ervin M. Combs

[57] ABSTRACT

A pressure-actuated release mechanism is assembled using a prebuckled pipe segment as a pressure-triggering mechanism. The trigger mechanism is employed to attach buoys to an offshore structure or pipeline under construction. The attached buoys move with the structure or newly added pipe string toward the sea bottom, easing the descent. As a preselected external pressure is sensed, the buckle in the pipe segment propagates and the trigger mechanism actuates, releasing buoys from the structure or pipeline as each buoy in turn reaches the same depth or pressure.

4 Claims, 4 Drawing Figures

A. BEFORE RELEASE

B. AFTER RELEASE

A. MECHANICALLY DENT THE CENTER OF A CAPPED, STUB PIPE.

B. PLACE PIPE IN PRESSURE VESSEL AND PROPAGATE BUCKLE SOMEWHAT FURTHER BY PUMPING HYDRAULIC FLUID (OR WATER) INTO THE VESSEL. NOTE THE PRESSURE REQUIRED TO PROPAGATE THE BUCKLE: THIS WILL BE RELEASE PRESSURE OF THE RELEASE MECHANISM.

C. CUT PIPE IN HALF AND WELD SHUT THE ENDS.

METHOD OF PREPARING AND USING A PRESSURE ACTUATED RELEASE MECHANISM

This is a continuation of application Ser. No. 135,835, filed Mar. 31, 1980, abandoned.

BACKGROUND OF THE INVENTION

In subsea construction and repair activities it is often required to attach one or more buoys to heavy structures or pieces of equipment to facilitate subsea emplacement. In such a way the effective underwater weight is reduced to a manageable value, minimizing the chances of damage during subsea installation and minimizing surface crane requirements after launching and during lowering and placement of the structures. Connections between the buoys and the structure are often made with bolts, eyes, hooks and other hardware. If it is necessary to release the buoys, this can be done with the direct help of divers, but it is considered safer to release the connections remotely, using explosives or acoustically triggered release mechanisms. Unfortunately, actively triggered mechanisms can be triggered accidentally and can fail to trigger when needed.

The use of such buoys is particularly attractive for laying a pipeline in deep water from a laybarge. It has been the general practice in the art to provide stability and support to a pipestring during an offshore pipe laying operation by means of a stinger, which is a mechanical structure extending from a hinged joint at the rear of the barge to or toward the submarine floor. However, a stinger must be quite long for laying a pipeline in deep water, for example 200 to 1000 feet or more. As a result such a stinger is expensive, difficult to control, and vulnerable to weather damage. Accordingly, in laying a deep water pipeline, buoys are used as an alternative to stingers for supporting the pipestring during the pipelaying operation. U.S. Pat. No. 3,727,417 discloses a system for laying underwater pipelines using buoyant spheres connected by cables which are attached to the pipeline at calculated intervals. As the pipeline is laid, it forms a sloping curve, and as the pipeline reaches bottom, the spheres are released and float to the surface. U.S. Pat. No. 3,620,028 discloses a similar system for laying underwater pipelines wherein cable-connected floats are attached to the pipeline at selected intervals; a release mechanism disengages the floats as the pipeline reaches the bottom, and the floats rise to the surface where they are collected. Other pertinent art includes U.S. Pat. Nos. 3,262,275; 3,765,185; 3,795,115; 3,835,655; 3,909,774; 3,921,562. From this art, it is evident that there is no actuation means for releasing flotation from a pipestring which is both inexpensively constructed and fully reliable to disengage a pipeline at a selected water pressure. However, such actuation means is provided by the present invention, as will be evident from the following disclosure.

SUMMARY OF THE INVENTION

Apparatus is provided by the present invention for use in deploying a structure below the surface of water by a controlled descent which includes a flotation means, a fastening means for releasably securing the flotation means to the structure and an actuating means susceptible to buckling at a preselected water pressure to selectively release the fastening means. The structure may be a submarine pipeline, or subsea structural elements for oil/gas production or other subsea activities.

More specifically, the present invention pertains to the use of a mechanism of external pressure buckling of a pipe or cylindrical container or pressure vessel as a trigger to release a buoyant structure. One use of the invention is to release buoys from a pipeline being deployed in relatively deep water. The buoys can be attached at intervals along the pipeline, and as water is allowed to enter the pipeline, the attached buoys move toward the bottom with the pipeline. As a preselected external pressure or water depth is sensed by pressure buckling of the pipe, etc., the trigger is activated and the mechanism releases, separating the buoys from the pipeline as each one in turn reaches the selected (same or different) pressure or water depth. By using buoys and the release mechanisms of this invention, a pipeline is laid without using a stinger at the stern of a pipelay vessel to prevent the pipe from bending failure during the lowering process. Other uses of the release mechanism are to attach buoys to any type of structure or equipment intended for subsea application. Offshore oil and gas exploration production activities include construction and repair operations which could utilize such a device. Still another application is to trigger any type of process, such as detonating an explosive at a predetermined water depth.

The present invention also pertains to a method for preparing the above noted release mechanism which is susceptible to buckling at a preselected pressure. This method includes denting the mid-section of a cylindrical container, propagating the dent with fluid pressure outside the cylindrical container to reduce the cross sectional area of the mid-section of the container without, however, substantially collapsing the container. Cutting the container into two parts at the reduced mid-section area, and closing the cut ends of the two parts of the container. Preferably, a container such as a capped pipe is mechanically dented near the center, placed in a pressure vessel and fluid admitted thereinto to propagate the dent somewhat further by pumping hydraulic fluid or water into the vessel. The pressure required to propagate the dent or buckle is noted since this will be the release pressure of the release mechanism. The pipe is then cut in half and the ends may be capped or otherwise welded shut. This prebuckled pipe then, in effect, becomes a trigger for the above noted release mechanism.

DESCRIPTION OF PREFERRED EMBODIMENTS

The present invention provides a technique for utilization of a failure mechanism, i.e., the gross flattening of a cylindrical pressure vessel under external pressure, to perform useful work through the passive, pressure actuated release of a buoy from the structure or equipment it is supporting. The nature of the so-called propagating buckle of a cylindrical vessel under external pressure is such that there is a large change in shape from, for instance, a round pipe to its fully flattened shape. In this way the actuation, or triggering, of the mechanism can be made to cause a large release stroke. This large stroke makes it possible to use this type of failure mechanism to its fullest extent.

Figure 1:
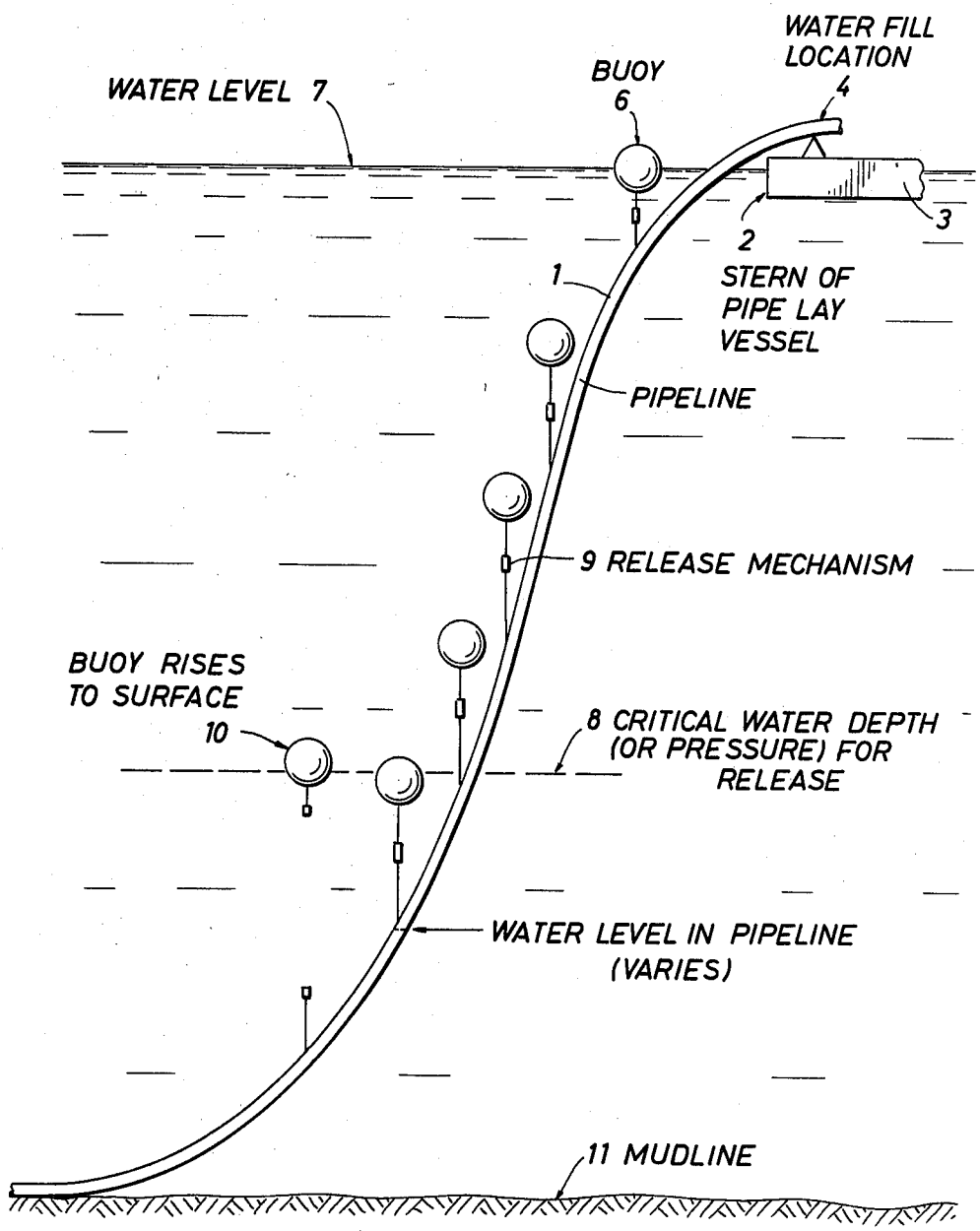
FIG. 1 discloses a pipelay application of the invention.

Referring now to the drawings and in particular to FIG. 1 thereof, there is shown a method for laying a submarine pipeline 1 from stern 2 of a barge 3. Water is admitted to the pipeline at waterfill location 4 to maintain a water level 5 which varies somewhat during the pipelay operation. As the pipeline 1 passes over the stern of the vessel, buoys 6 are attached, and pipeline and buoys descend beneath water level 7 to a critical water depth 8 (designated by a dotted line) where release of the buoys from the pipeline occurs. When release mechanism 9 is activated, a buoy 10 is released and starts to rise to the surface of the water, leaving the release mechanism still attached to the pipeline where it will remain indefinitely. Then the pipeline gradually settles down to the mud 11 without the stresses which might otherwise occur with the use of a stinger only.

Figure 2:
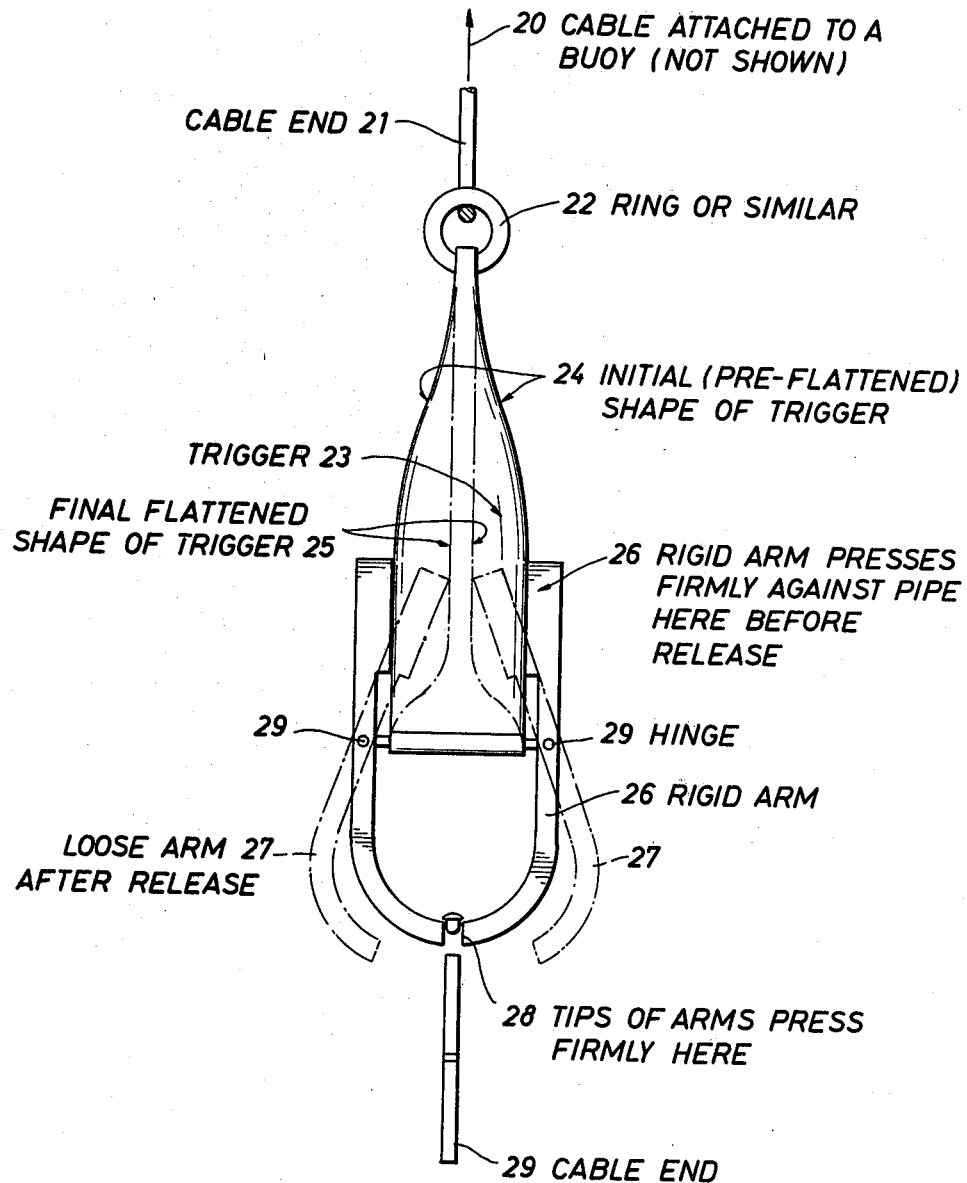
FIG. 2 depicts a basic release mechanism.

In FIG. 2 there is shown the basic release mechanism 9 described above. A cable 20 is attached to a buoy (not shown in this figure) and to a cable end 21 which in turn is attached to a connecting ring 22 or similar means which is attached to trigger 23.

The preflattened trigger 23, prior to being activated, is shown with sides 24 in solid outline. The final flattened shape of trigger 23, after being activated, is shown with sides 25 in phantom. Rigid arms 26 show the position thereof in solid outline before the release mechanism is activated. Loose arms 27 shown in phantom configuration, show the position of arms 26 in dotted outline after the release mechanism is activated and the trigger is flattened. Thus, the water pressure causes the trigger to buckle, arms 26 pivot about hinges 27 and arm tips 28 move apart, releasing cable end 29 which is in turn attached to the structure being deployed beneath the surface of water, e.g., a pipeline or other oil production equipment (not shown in this figure).

Figure 3:
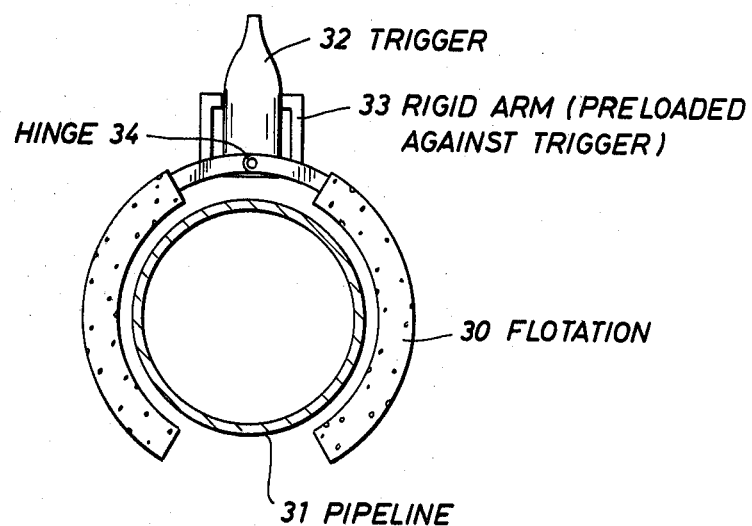
FIG. 3 shows a collar release mechanism.
Figure 3:
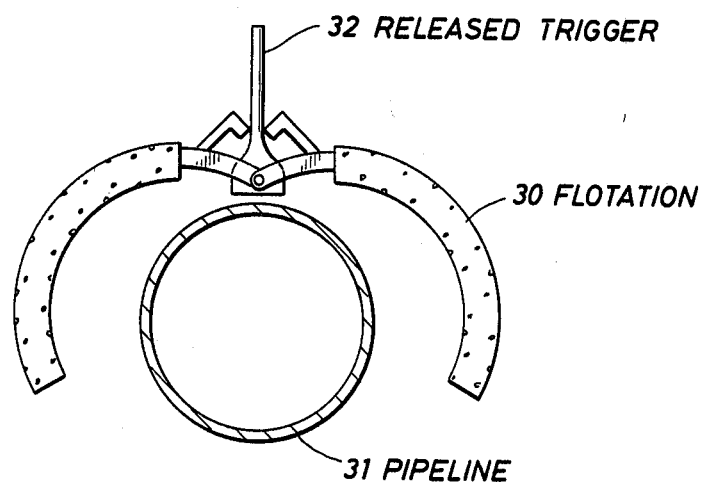

A variation of the invention employing a collar release mechanism is shown in FIG. 3, step A. Flotation collar 30 encircles a pipeline (or other structure) 31. Trigger 32 has a rigid arm 33 preloaded against the trigger and connected to the flotation 30. As the trigger releases, step B, by flattening, the arm 33 opens the flotation collar 30 about hinge 34, and drops the pipeline 31 (or other structure, e.g., oil production equipment).

Figure 4:
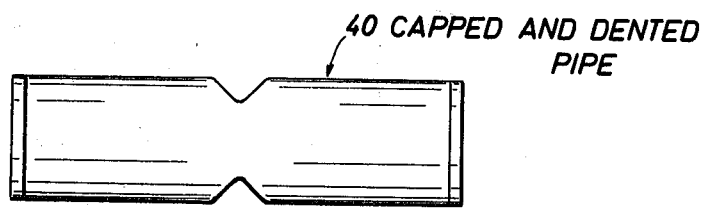
FIG. 4 shows the steps involved in making a trigger for the release mechanism.
Figure 4:
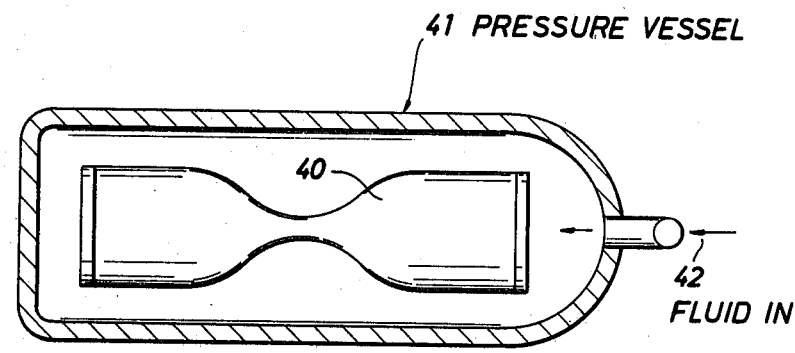
Figure 4:
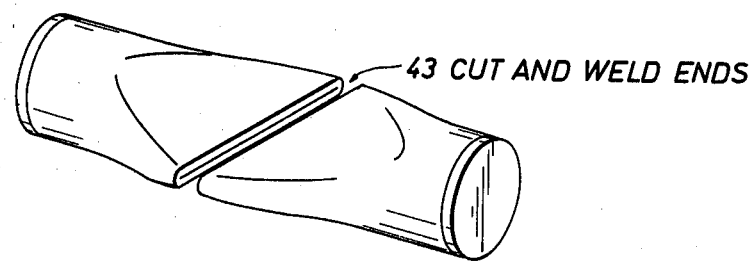

In FIG. 4, the steps for making a prebuckled pipe for the trigger of the release mechanism are shown in steps A, B and C. In step A, a container such as a capped pipe 40 is mechanically dented in the center. Any cylindrical pressure vessel of arbitrary cross-section can be used and other mechanical techniques for denting the container may be utilized. In step B, a pressure vessel 41 encompasses the capped and dented pipe 40 and a hydraulic fluid 42 under pressure is passed thereinto. The buckle initiated in step A is propagated by the hydraulic fluid. The pressure required to propagate the buckle is noted since this will be the release pressure of the release mechanism. In step C, the pipe is cut in half and welded or otherwise closed at mid-section 43.

What is claimed is:

1. A method for preparing and using an actuating means susceptible to substantially collapsing at a preselected fluid pressure, comprising:

mechanically denting an outer surface of a closed vessel;

propagating the dent with fluid pressure outside the closed vessel to reduce the cross-sectional area of at least part of the closed vessel without substantially collapsing the closed vessel, thereby forming the actuating means;

observing the pressure necessary to propagate the dent; and disposing the actuating means in an environment wherein the pressure necessary to propagate the dent is a critical pressure which will substantially collapse the actuating means.

2. The method of claim 1 including cutting said closed vessel into two parts at its mid-section after denting said mid-section.

3. The method of claim 2 including closing the cut ends of the two parts of said closed vessel.

4. The method of claim 1 wherein said closed vessel is a capped pipe.

* * * * *